US012142188B2

(12) United States Patent
Cai

(10) Patent No.: US 12,142,188 B2
(45) Date of Patent: Nov. 12, 2024

(54) DISPLAY PANEL, DRIVING METHOD, AND DISPLAY DEVICE

(71) Applicant: TCL CHINA STAR OPTOELECTRONICS TECHNOLOGY CO., LTD., Guangdong (CN)

(72) Inventor: Miaorong Cai, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 99 days.

(21) Appl. No.: 17/897,286

(22) Filed: Aug. 29, 2022

(65) Prior Publication Data

US 2024/0038136 A1 Feb. 1, 2024

(30) Foreign Application Priority Data

Jul. 27, 2022 (CN) ........................ 202210892222.3

(51) Int. Cl.
*G09G 3/20* (2006.01)

(52) U.S. Cl.
CPC ... *G09G 3/2096* (2013.01); *G09G 2310/0267* (2013.01); *G09G 2310/0275* (2013.01); *G09G 2320/0233* (2013.01)

(58) Field of Classification Search
CPC ............... G09G 3/2092; G09G 3/2096; G09G 5/00–008; G09G 2310/08; G09G 2310/0264; G09G 2310/0267; G09G 2310/0275; G09G 2310/0272; G09G 2310/0278; G09G 2320/0233; G09G 2320/0258; G09G 2320/0242
See application file for complete search history.

(56) References Cited

U.S. PATENT DOCUMENTS

2020/0357327 A1* 11/2020 Lee ...................... G09G 3/3266
2020/0394968 A1* 12/2020 Kwon .................. G09G 3/3266

* cited by examiner

*Primary Examiner* — Diane M Wills

(57) ABSTRACT

A display panel, a driving method, and a display device are disclosed. The display panel includes a plurality of pixel units, a gate driver, a source driver, a plurality of feedback lines, and a control module. The display panel is provided with the plurality of feedback lines electrically connected to the gate driver and the control module, such that the control module can detect turn-on time of the pixel units respectively located in at least two pixel areas through the plurality of feedback lines and adjust time when the source driver outputs data signals according to the turn-on time. This solves an issue of uneven display brightness due to inconsistent pixel charging time in the prior art.

17 Claims, 6 Drawing Sheets

DISPLAY PANEL, DRIVING METHOD, AND DISPLAY DEVICE

RELATED APPLICATIONS

This application claims the benefit of priority of Chinese Patent Application No. 202210892222.3 filed on Jul. 27, 2022, the contents of which are incorporated by reference as if fully set forth herein in their entirety.

FIELD OF THE DISCLOSURE

The present application relates to the technical field of display technologies, and more particularly, to a display panel, a driving method, and a display device.

BACKGROUND

With the development of the display industry, various performance requirements for panels have been increased, and resolution requirements of panels have also been continuously improved. A refresh rate of the panel is increased, such that panel charging time is continuously shortened. In addition, due to an influence of a panel manufacturing process, the panel has a large resistance and capacitance load. Resistive and capacitive load gradually increases from a position near the gate driver to a position far from the gate driver. Such a difference in the resistive and capacitive load may result in a delay in transmission of scan signals, and thus leads to a delay in pixel turn-on time. This results in inconsistent pixel charging time of pixel units in various areas of the display panel. The charging time of the pixels on the display panel close to a gate driving device is significantly longer than the charging time of the pixels on the display panel farther from the gate driving device. The uneven charging of each pixel unit on the display panel may lead to uneven display brightness of the display panel, and in severe cases, it may lead to a color cast of the picture.

In view of this, there is an urgent need in the art for a display panel, a driving method, and a display device to solve an issue of uneven display brightness in the prior art due to inconsistent pixel charging time.

SUMMARY

The present application provides a display panel, a driving method, and a display device, which solve an issue of uneven display brightness due to inconsistent charging time of pixels in the prior art.

On one hand, an embodiment of the present application provides a display panel, including: a plurality of pixel units arranged in an array and divided into at least two pixel areas arranged along a first direction; a plurality of scan lines arranged at intervals along a second direction, wherein one of the plurality of scan lines is connected to at least two pixel units in a same row; a plurality of data lines arranged at intervals along the first direction and insulated and intersected with the plurality of scan lines, wherein one of the plurality of data lines is connected to at least one pixel unit in a same column; a gate driver electrically connected with the plurality of scan lines; a source driver electrically connected with the plurality of data lines; a plurality of feedback lines, wherein one ends of plurality of the feedback lines are electrically connected to at least one of the plurality of scan lines, and the one ends of the plurality of the feedback lines are distributed in the at least two pixel areas; and a control module electrically connected with the gate driver, the source driver, and another ends of the plurality of the feedback lines, wherein the control module is configured to detect turn-on time of the pixel units respectively located in the at least two pixel areas through the plurality of feedback lines and adjust time when the source driver outputs data signals according to the turn-on time.

Optionally, in some embodiments of the present application, the control module comprises a timing controller, the timing controller is electrically connected to the gate driver, the source driver, and the another ends of the plurality of the feedback lines, the timing controller is configured to detect the turn-on time of the pixel units respectively located in the at least two pixel areas through the plurality of feedback lines and adjust the time when the source driver outputs the data signals according to the turn-on time.

Optionally, in some embodiments of the present application, the control module comprises a timing controller and a microprocessor, the timing controller is electrically connected to the gate driver, the source driver, and the microprocessor, the microprocessor is electrically connected to the another ends of the plurality of the feedback lines, the microprocessor is configured to detect the turn-on time of the pixel units respectively located in the at least two pixel areas through the plurality of feedback lines and feed the turn-on time back to the timing controller, and the timing controller is configured to adjust the time when the source driver outputs the data signals according to the turn-on time.

Optionally, in some embodiments of the present application, a number of columns of the pixel units spaced between the plurality of feedback lines is same.

Optionally, in some embodiments of the present application, the turn-on time of the pixel units is time required for a voltage value of a scan signal of the pixel units to rise from 10% to 90% of a peak value of a scan signal voltage.

Optionally, in some embodiments of the present application, the one ends of the plurality of the feedback lines are electrically connected to positions of a same scan line corresponding to the pixel units in a one-to-one correspondence.

Optionally, in some embodiments of the present application, the control module is configured to adjust the time when the source driver outputs the data signals according to the turn-on time, such that the pixel units located in a same pixel area receive a same delay time of the data signals, and the delay time of the data signals applied in the pixel area closer to the gate driver is larger.

Optionally, in some embodiments of the present application, an output time difference T of the data signals corresponding to the pixel units in the two pixel areas is: $T=t_n-t_m$, wherein $t_n$ represents the turn-on time of the pixel units in an nth pixel area along a direction away from the gate driver, $t_m$ represents the turn-on time of the pixel units in an mth pixel area along the direction away from the gate driver, wherein both n and m are positive integers, and n is greater than m.

Optionally, in some embodiments of the present application, each of the pixel areas comprises at least two columns of pixel units, and the one ends of the plurality of the feedback lines are connected to a position of the scan line corresponding to one column of pixel units, the one column of pixel units is a feedback pixel unit column; an output time difference T' of the data signals corresponding to the feedback pixel unit column in an adjacent pixel area is: $T'=t_n-t_{n-1}$, wherein $t_n$ represents the turn-on time of the pixel units in an nth pixel area along a direction away from the gate driver, and $t_{n-1}$ represents the turn-on time of the pixel units in an n−1th pixel area along the direction away from the gate driver; and wherein an output time of pixel unit columns other than the feedback pixel unit column in the pixel area is determined according to an output time interpolation of the data signals corresponding to nearest feedback pixel unit columns located on opposite sides of one of the pixel unit columns.

The present application also provides a driving method for driving the above-mentioned display panel, including: dividing a plurality of pixel units into at least two pixel areas arranged along a first direction, providing a plurality of feedback lines, wherein the plurality of feedback lines are distributed in the at least two pixel areas; providing scan signals to the pixel units and the pixel units to be turned on; detecting turn-on time of the pixel units respectively located in the at least two pixel areas through the plurality of feedback lines and adjusting time when a source driver outputs data signals according to the turn-on time.

In another aspect, the present application provides a display device including the above-mentioned display panel.

The present application provides a display panel, a driving method, and a display device. The display panel includes a plurality of pixel units, a gate driver, a source driver, a plurality of feedback lines. and a control module. The display panel is provided with a feedback line electrically connected to the gate driver and the control module, such that the control module can detect turn-on time of the pixel units respectively located in at least two pixel areas through the plurality of feedback lines and adjust time when the source driver outputs data signals according to the turn-on time, so as to solve an issue of uneven display brightness caused by inconsistent pixel charging time in the prior art and improve a display performance.

BRIEF DESCRIPTION OF THE DRAWINGS

The present application will be further described below with reference to the accompanying drawings. It should be noted that the accompanying drawings in the following description are only used to illustrate some embodiments of the present application. For those skilled in the art, other drawings can also be obtained from these drawings without creative effort.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in this application, all other embodiments obtained by those skilled in the art without creative efforts shall fall within the protection scope of this application.

Embodiments of the present application provide a display panel, a driving method, and a display device, which can solve an issue of uneven display brightness in the prior art due to inconsistent pixel charging time. Each of them will be described in detail below. It should be noted that the description order of the following embodiments is not intended to limit the preferred order of the embodiments. In addition, in the description of this application, the term "including" means "including but not limited to". The terms "first," "second," "third," etc. are used merely as labels to distinguish between different objects, rather than to describe a particular order.

Figure 1:
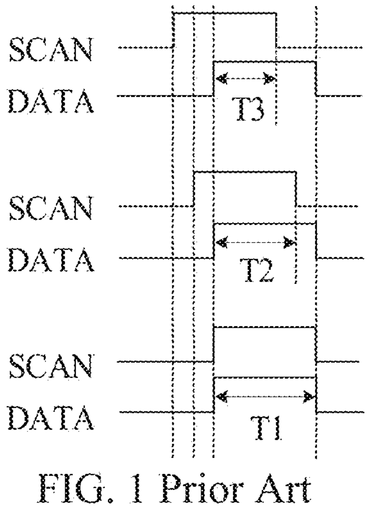
FIG. 1 Prior Art
FIG. 1 is a timing diagram of a display panel in a conventional display.

As shown in FIG. 1, FIG. 1 is a timing diagram of a display panel in a conventional display. In the conventional display panel, a gate driver outputs a scan signal SCAN to a scan line. A source driver outputs a data signal DATA to a data line. The scan signal SCAN may cause a transmission delay due to a resistance and capacitance load of the scan line. The transmission delay of the scan signal SCAN may cause a charging time T of the pixel units at different distances from the gate driver in the display panel to be inconsistent. The charging time for the pixel units away from the gate driver is T3. The charging time for pixel units close to the gate driver is T1. The charging time of the pixel unit located in the middle of the scan line is T2. As shown in FIG. 1, the charging time T1 is greater than the charging time T2, and the charging time T2 is greater than the charging time T3. Due to the uneven charging of each pixel unit on the display panel, the display brightness of the display panel may be uneven, and in severe cases, a color cast of a picture may be caused. It should be noted that waveforms in FIG. 1 are only schematic ideal waveforms, which indicates the charging time of the pixel unit, and the actual waveform may have waveform deviation. That is, a voltage value of the scan signal SCAN and a voltage value of the data signal DATA have a rising or falling process, instead of reaching a voltage peak value or dropping to 0 in an instant.

Figure 2:
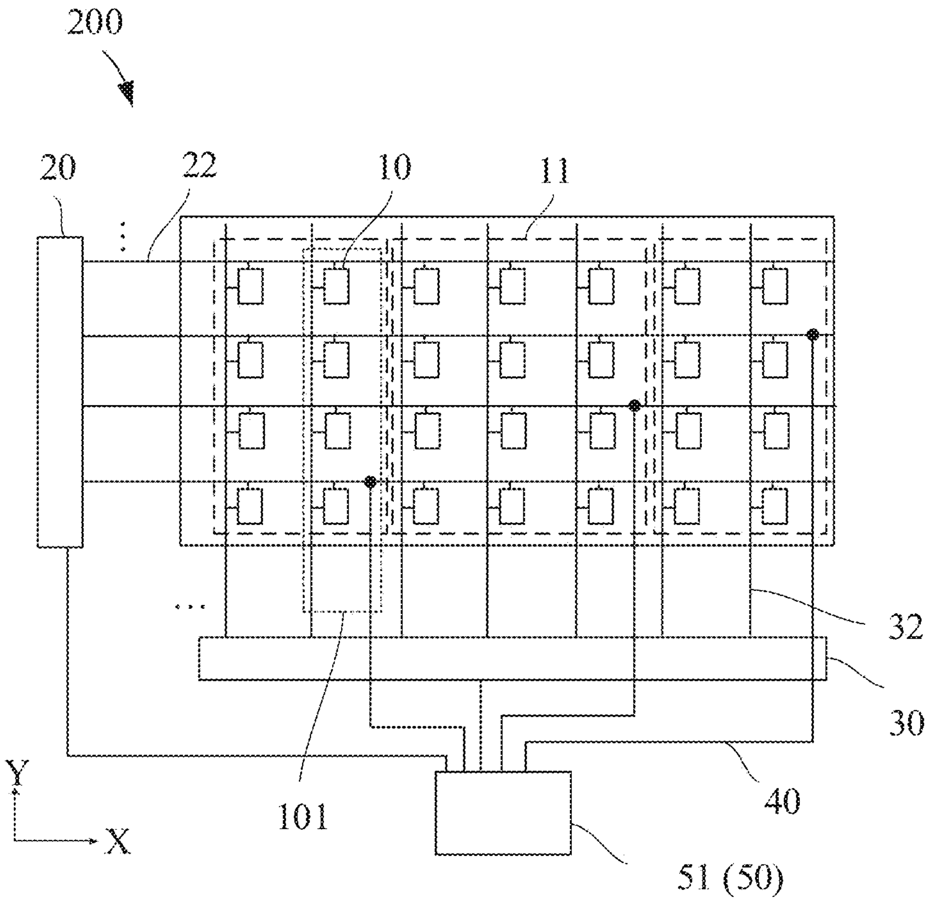
FIG. 2 is a schematic structural diagram of a first display panel provided by an embodiment of the present application.

Please refer to FIG. 2, which is a schematic structural diagram of a first display panel provided by an embodiment of the present application. As shown in FIG. 2, an embodiment of the present application provides a display panel 100 including a plurality of pixel units 10, a gate driver 20, a source driver 30, a plurality of feedback lines 40, and a control module 50.

In the embodiment of the present application, the pixel units 10 are arranged in an array and are divided into at least two pixel areas 11 arranged along a first direction X. Charging time of the pixel units 10 in each pixel area 11 is the same. Specifically, the display panel includes M rows and N columns of pixel units 10, where M and N are both positive integers. Only three pixel areas 11 are shown in FIG. 2, and the number of columns of pixel units 10 in the three pixel areas 11 is different. It should be noted that those skilled in the art can adjust the number of pixel areas 11 and the number of columns of pixel units 10 included in each pixel area 11 as required, which is not limited herein.

In the embodiment of the present application, the gate driver 20 is electrically connected to the pixel units 10. The gate driver 20 is configured to provide scan signals to control the pixel units 10 to be turned on. The source driver 30 is electrically connected to the pixel units 10. The source driver 30 is configured to provide data signals to charge the pixel units 10 in an on state.

In the embodiment of the present application, one ends of plurality of the feedback lines 40 are electrically connected to the gate driver 20 respectively, and one ends of the plurality of feedback lines 40 are distributed in at least two pixel areas 11.

In the embodiment of the present application, the control module 50 is electrically connected to the gate driver 20, the source driver 30, and the another ends of the plurality of feedback lines 40. The control module 50 is configured to detect the turn-on time of the pixel units 10 respectively located in the at least two pixel areas 11 through the plurality of feedback lines 40 and adjust the time when the source driver 30 outputs the data signals according to the turn-on time.

In this embodiment of the present application, the gate driver 20 is electrically connected to the plurality of scan lines 22. The plurality of scan lines 22 are arranged at intervals along the second direction Y. Each scan line 22 connects at least two pixel units 10 in the same row. One ends of the plurality of the feedback lines 40 are respectively electrically connected to at least one scan line 22. Specifically, each scan line 22 is electrically connected to the pixel units 10 respectively. FIG. 2 exemplarily shows two feedback lines 40, which are respectively disposed in the first pixel area 11 along the direction away from the gate driver and disposed in the third pixel area 11 along the direction away from the gate driver 20. One ends of the two feedback lines 40 are respectively electrically connected to the two scan lines 22, and another ends of the two feedback lines 40 are respectively electrically connected to the timing controller 51.

In the embodiment of the present application, the source driver 30 is electrically connected to a plurality of data lines 32. The plurality of data lines 32 are arranged at intervals along the first direction X and are insulated and intersected with the plurality of scan lines 22. The plurality of data lines 32 are respectively connected to at least one pixel unit 10 in different columns. Specifically, each data line 32 is connected to at least one pixel unit 10 in the same column.

In this embodiment of the present application, the control module 50 includes a timing controller 51. The timing controller 51 is electrically connected to the gate driver 20, the source driver 30, and another ends of the plurality of feedback lines 40. Specifically, the timing controller 51 is electrically connected to the gate driver 20, the source driver 30, and the two feedback lines 40.

In the embodiment of the present application, the turn-on time of the pixel unit is the time required for the voltage value of the scan signal of the pixel unit to increase from 10% to 90% of the peak value of the scan signal voltage. Specifically, the turn-on time of the pixel unit may also be the time required for the scan signal voltage value of the pixel unit to rise from 80%, 70%, 60%, 50%, 40%, 30%, 20%, etc. of the peak value of the scan signal voltage to 90%. Those skilled in the art can adjust as needed, which is not limited in this application.

In the embodiment of the present application, the data signals provided by the source driver 30 to the plurality of data lines 32 are sequentially delayed in a direction close to the gate driver 20. This makes the time when the pixel units 10 in different pixel areas 11 are turned on and the time of charging tend to be consistent. Specifically, the gate driver 20 outputs scan signals to the plurality of scan lines 22. Because the resistive and capacitive load on the plurality of scan lines gradually increases from a position near the gate driver 20 to a position far from the gate driver 20, such a difference in the resistive and capacitive load may cause a delay in the transmission of scan signals, thereby delaying the turn-on time of the pixels. The delay effect is most severe at locations farther from the gate driver 20. This makes the charging time of the pixel unit 10 in the pixel area 11 farther from the gate driver 20 significantly shorter than the charging time of the pixel unit 10 in the pixel area 11 closer to the gate driver 20. Therefore, the control module 50 adjusts the output time of the data signal according to the turn-on time of the pixel units 10 in different pixel areas 11. This makes the pixel units 10 located in the same pixel area 11 have the same delay time for receiving data signals. The delay time of the data signal applied in the pixel area 11 which is closer to the gate driver 20 is larger.

In the embodiment of the present application, the delay time of the data signal provided by the source driver 30 to the pixel units 10 of the at least two pixel areas 11 is an absolute value of the time difference.

In the embodiment of the present application, an output time difference T of the data signals corresponding to the pixel units 10 in the two pixel areas 11 is calculated by the following formula:

$T=t_n-t_m$, wherein $t_n$ represents the turn-on time of the pixel units 10 in an nth pixel area 11 along a direction away from the gate driver 20, $t_m$ represents the turn-on time of the pixel units 10 in an mth pixel area 11 along the direction away from the gate driver 20, wherein both n and m are positive integers, and n is greater than m.

As shown in FIG. 2, in one embodiment, the pixel units 10 are arranged in an array and are divided into three pixel areas 11 arranged along a first direction X. The charging time of the pixel unit 10 in the third pixel area 11 in the direction away from the gate driver 20 is compared to the output time difference T of the data signals corresponding to the pixel unit in the first pixel area 11 along the direction away from the gate driver 20 as: $T=t_3-t_1$. That is, the delay time of the data signals applied to the first pixel area 11 is the absolute value of $T=t_3-t_1$. The charging time of the pixel unit 10 in the third pixel area 11 in the direction away from the gate driver 20 is compared to the output time difference T of the data signals corresponding to the pixel unit 10 in the second pixel area 11 along the direction away from the gate driver 20 as: $T=t_2-t_1$. That is, the delay time of the data signals applied to the second pixel area 11 is the absolute value of $T=t_2-t_1$. It should be noted that, in this embodiment, the delay time of the data signals applied to the first pixel area 11 and the second pixel area 11 is based on the output time of the data signal of the third pixel area 11. It can be understood that the output time of the data signals applied to the other pixel areas 11 may be adjusted based on the output time of the data signals of the other pixel areas 11 according to specific requirements.

In the embodiment of the present application, each pixel area 11 includes at least two columns of pixel units 10. One ends of the plurality of the feedback lines 40 are connected to a position of the scan line 22 corresponding to one column of the pixel units 10. The one column of pixel units 10 is a feedback pixel unit column 101. The output time difference T' of the data signals corresponding to the feedback pixel unit column 101 in the adjacent pixel area 11 is: $T'=t_n-t_{n-1}$, wherein $t_n$ represents the turn-on time of the pixel units in an nth pixel area 11 along a direction away from the gate driver

20, and $t_{n-1}$ represents the turn-on time of the pixel units 10 in an n−1th pixel area 11 along the direction away from the gate driver 20.

An output time of pixel unit columns other than the feedback pixel unit column 101 in the pixel area is determined according to an output time interpolation of the data signals corresponding to nearest feedback pixel unit columns 101 located on opposite sides of one of the pixel unit columns. For example, the charging time of the nth feedback pixel unit column 101 in the direction away from the gate driver 20 is compared to the output time difference T of the data signals corresponding to the n−1th feedback pixel unit column 101 along the direction away from the gate driver 20 as $T=t_n-t_{n-1}$. That is, the delay time between the output time of the data signals applied to the n−1th feedback pixel unit column 101 and the output time of the data signal applied to the n−1th feedback pixel unit column 101 is $t_n-t_{n-1}$. If there are two pixel unit columns 10 between two adjacent feedback pixel unit columns 101, the output time of the data signals corresponding to the pixel unit column 10 close to the nth feedback pixel unit column 101 is $t_n-T/3$, and the output time of the data signals corresponding to the pixel unit column 10 close to the nth feedback pixel unit column 101 is $t_n-2T/3$.

Figure 3:
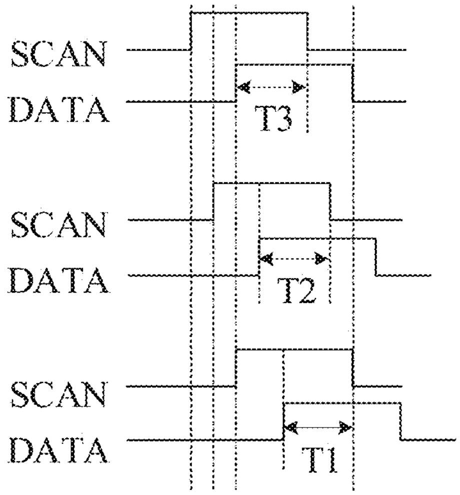
FIG. 3 is a schematic timing diagram of a display panel provided by an embodiment of the present application.

Refer to FIG. 3, which is a schematic timing diagram of a display panel provided by an embodiment of the present application. Referring to FIG. 2 and FIG. 3, the gate driver outputs the scan signal SCAN to the scan line 22, and the source driver 30 outputs the data signal DATA to the data line 32. The charging time of the pixel unit 10 in the third pixel area 11 in the direction away from the gate driver 20 is T3. The charging time of the pixel unit 10 in the second pixel area 11 in the direction away from the gate driver 20 is T2. The charging time of the pixel unit 10 in the first pixel area 11 in the direction away from the gate driver 20 is T1.

In the embodiment of the present application, the timing controller 51 detects the turn-on time of the pixel units 10 in the two pixel areas 11 through the two feedback lines 40 and adjusts the output time of the corresponding data signal DATA in each pixel area 11 according to the turn-on time. The delay time of the data signal applied in the pixel region closer to the gate driver 20 is larger. As shown in FIG. 3, the time of the data signal output from the data line 32 gradually decreases with the delay time in the direction away from the gate driver 20 during the horizontal scanning period. This makes it possible to minimize the difference in charging time among the pixel units 10 in each pixel area, thereby improving an issue of inconsistency in the charging time among the pixel units 10 in each pixel area.

Figure 4:
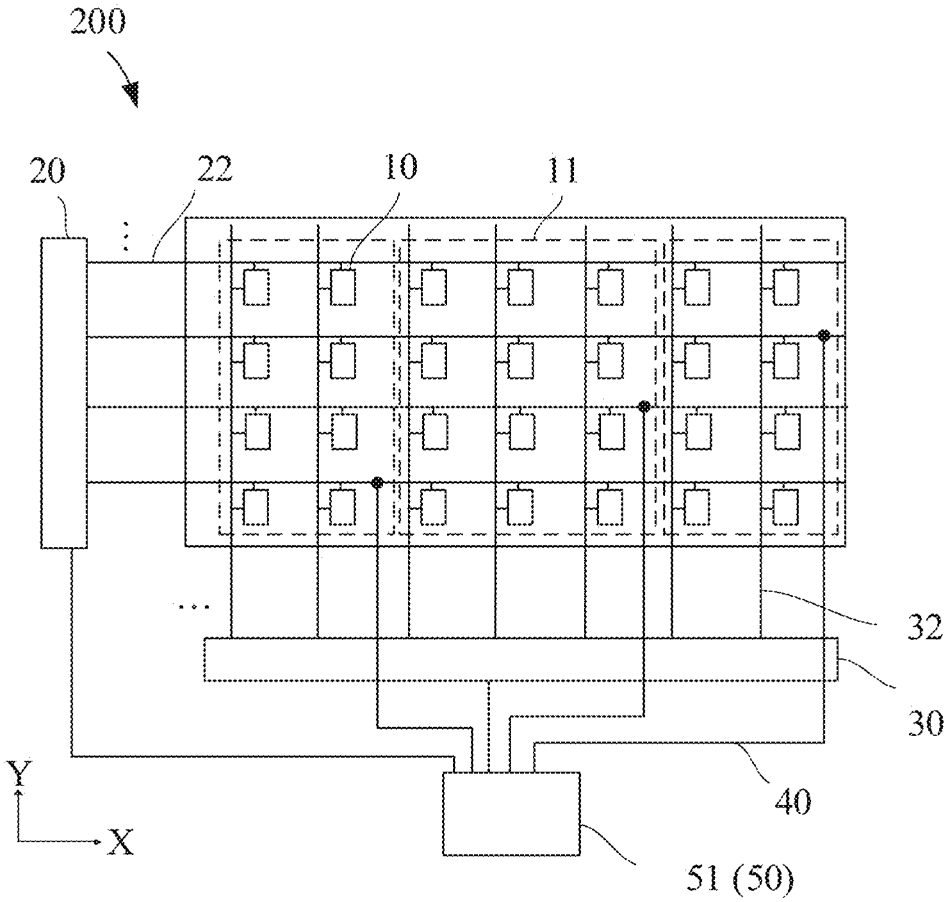
FIG. 4 is a schematic structural diagram of a second display panel provided by an embodiment of the present application.

Refer to FIG. 4, which is a schematic structural diagram of a second display panel provided by an embodiment of the present application. As shown in FIG. 4, the present application provides a display panel 200. The difference between the display panel 200 and the display panel 100 is that each pixel area 11 is provided with at least one feedback line 40 respectively, and the pixel units 10 in the same pixel area 11 have the same delay time for receiving data signals.

The display panel 200 provided in this embodiment of the present application includes a plurality of pixel units 10, a gate driver 20, a plurality of scan lines 22, a source driver 30, a plurality of data lines 32, a plurality of feedback lines 40, and a timing controller 51.

In the embodiment of the present application, as exemplarily shown in FIG. 4, a plurality of pixel units 10 are arranged in an array and are divided into three pixel areas 11 arranged along the first direction X. Each pixel area 11 is provided with a feedback line 40. The gate driver 20 is electrically connected to the plurality of scan lines 22, and the source driver 30 is electrically connected to the plurality of data lines 32. One ends of the three feedback lines 40 are electrically connected to the three scan lines 22 respectively. The timing controller 51, the gate driver 20, and the source driver 30 are electrically connected to another ends of the three feedback lines 40. The data signals provided by the source driver 30 to the plurality of data lines 32 are sequentially delayed in a direction close to the gate driver 20. This makes the charging time of the pixel units 10 in different pixel areas 11 tend to be consistent. The specific delay algorithm is the same as that in the above-mentioned embodiment and is not repeated here.

Figure 5:
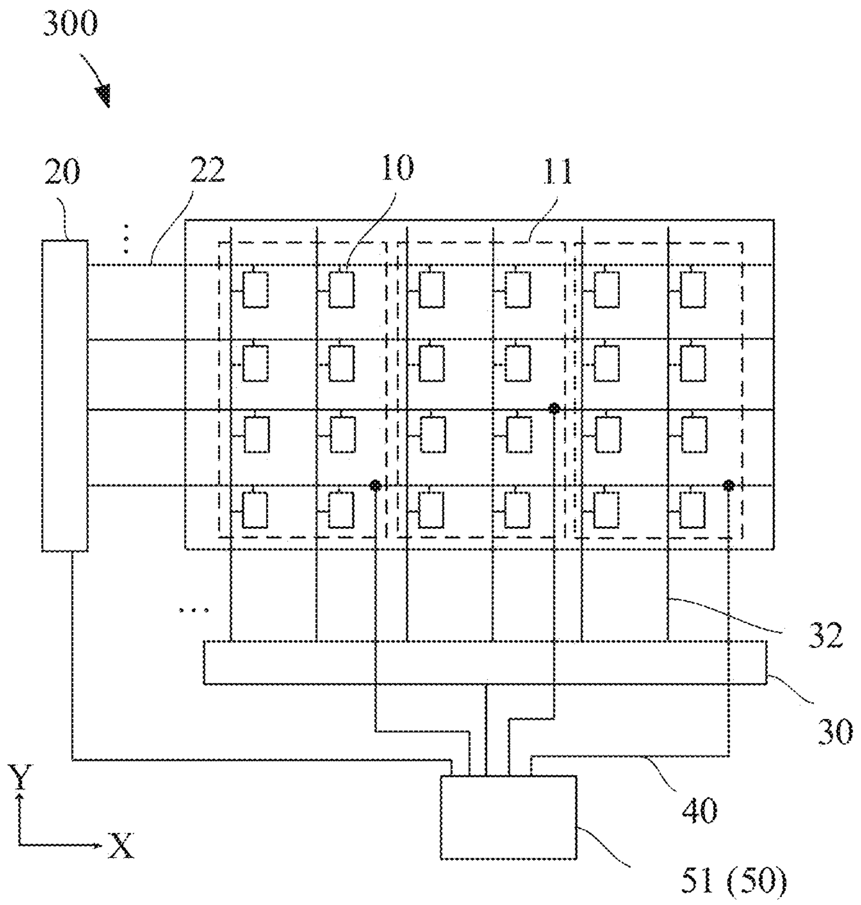
FIG. 5 is a schematic structural diagram of a third display panel provided by an embodiment of the present application.

Refer to FIG. 5, which is a schematic structural diagram of a third display panel provided by an embodiment of the present application. As shown in FIG. 5, the present application provides a display panel 300. The difference between the display panel 300 and the display panel 200 is that the number of columns of the pixel units 10 spaced between the plurality of feedback lines 40 is equal.

The display panel 300 provided in this embodiment of the present application includes a plurality of pixel units 10, a gate driver 20, a plurality of scan lines 22, a source driver 30, a plurality of data lines 32, a plurality of feedback lines 40, and a timing controller 51.

In the embodiment of the present application, each pixel area 11 is respectively provided with at least one feedback line 40. The charging time of the pixel units 10 located in the same pixel area 11 is the same. As exemplarily shown in FIG. 5, the plurality of pixel units 10 are arranged in an array and are divided into three pixel areas 11 arranged along the first direction X. Each pixel area 11 is provided with a feedback line 40. The gate driver 20 is electrically connected to the plurality of scan lines 22, and the source driver 30 is electrically connected to the plurality of data lines 32. One ends of the three feedback lines 40 are electrically connected to the two scan lines 22 respectively. The timing controller 51, the gate driver 20, and the source driver 30 are electrically connected to another ends of the three feedback lines 40. The data signals provided by the source driver 30 to the plurality of data lines 32 are sequentially delayed in a direction close to the gate driver 20. This makes the charging time of the pixel units 10 in different pixel areas 11 tend to be consistent. The specific delay algorithm is the same as that in the above-mentioned embodiment and is not repeated here.

Figure 6:
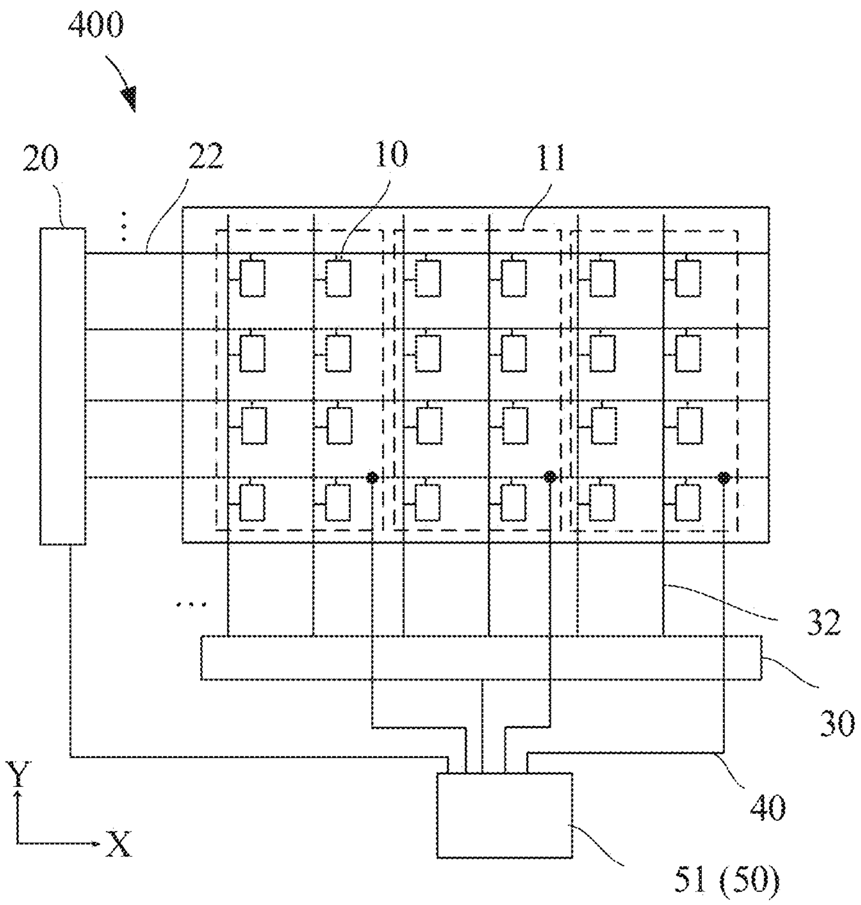
FIG. 6 is a schematic structural diagram of a third display panel provided by an embodiment of the present application.

Please refer to FIG. 6, which is a schematic structural diagram of a third display panel provided by an embodiment of the present application. As shown in FIG. 6, the present application provides a display panel 400. The difference between the display panel 400 and the display panel 300 is that one ends of the plurality of feedback line 40 are electrically connected to positions of the same scan line 22 corresponding to the plurality of pixel units in a one-to-one correspondence.

The display panel 400 provided by the embodiment of the present application includes a plurality of pixel units 10, a gate driver 20, a plurality of scan lines 22, a source driver 30, a plurality of data lines 32, a plurality of feedback lines 40, and a timing controller 51.

In the embodiment of the present application, each pixel area 11 is respectively provided with at least one feedback line 40. The charging time of the pixel units 10 located in the same pixel area 11 is the same. Further, the number of columns of pixel units 10 spaced between the plurality of feedback lines 40 is equal. As exemplarily shown in FIG. 6, the plurality of pixel units 10 are arranged in an array and are divided into three pixel areas 11 arranged along the first direction X. Each pixel area 11 is provided with a feedback line 40. The gate driver 20 is electrically connected to the plurality of scan lines 22, and the source driver 30 is electrically connected to the plurality of data lines 32. One ends of the three feedback lines 40 are respectively electrically connected to the same scan line 22. The timing controller 51, the gate driver 20, and the source driver 30 are electrically connected to another ends of the three feedback lines 40. The data signals provided by the source driver 30 to the plurality of data lines 32 are sequentially delayed in a direction close to the gate driver 20. This makes the charging time of the pixel units 10 in different pixel areas 11 tend to be consistent. The specific delay algorithm is the same as that in the above-mentioned embodiment and is not repeated here.

Figure 7:
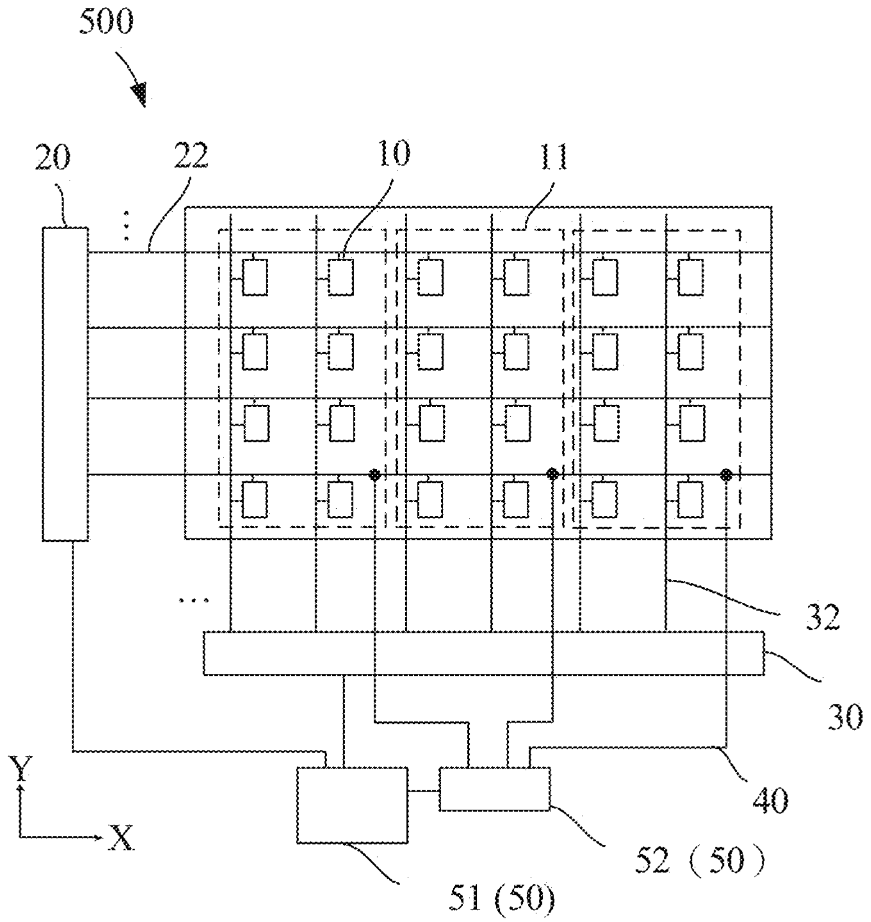
FIG. 7 is a schematic structural diagram of a third display panel provided by an embodiment of the present application.

Refer to FIG. 7, which is a schematic structural diagram of a third display panel provided by an embodiment of the present application. As shown in FIG. 7, the present application provides a display panel 500. The difference between the display panel 500 and the display panel 400 is that the control module 50 includes a timing controller 51 and a microprocessor 52. The timing controller 51 is electrically connected to the gate driver 20, the source driver 30, and the microprocessor 52. The microprocessor 52 is electrically connected to another ends of the plurality of feedback lines 40. The source driving module includes a source driver 30 and a plurality of data lines 32.

The display panel 500 provided in the embodiment of the present application includes a plurality of pixel units 10, a gate driver 20, a plurality of scan lines 22, a source driver 30, a plurality of data lines 32, a plurality of feedback lines 40, and a timing controller 51.

In the embodiment of the present application, each pixel area 11 is respectively provided with at least one feedback line 40. The charging time of the pixel units 10 located in the same pixel area 11 is the same. Further, the number of columns of pixel units 10 spaced between the plurality of feedback lines 40 is equal. One ends of the plurality of feedback lines 40 are electrically connected to the positions of the same scan line 22 corresponding to the plurality of pixel units 10 in a one-to-one correspondence. As exemplarily shown in FIG. 7, the plurality of pixel units 10 are arranged in an array and are divided into three pixel areas 11 arranged along the first direction X. Each pixel area 11 is provided with a feedback line 40. The gate driver 20 is electrically connected to the plurality of scan lines 22, and the source driver 30 is electrically connected to the plurality of data lines 32. One ends of the three feedback lines 40 are respectively electrically connected to the same scan line 22.

In this embodiment of the present application, the microprocessor 52 is electrically connected to another ends of the three feedback lines 40. The microprocessor 52 acquires the turn-on time of the pixel units 10 in the corresponding pixel area 11 through the feedback line 40 and according to the acquired turn-on time of the pixel units 10 in the at least two pixel areas 11. The microprocessor 52 is electrically connected to the timing controller 51 and sends the acquired turn-on time of the pixel unit 10 to the timing controller 51. The timing controller 51 controls the source driver 30 to control the delay time between the data signals provided to the at least two pixel units 10 in the at least two pixel areas 11 according to the turn-on time. The data signals provided by the source driver 30 to the plurality of data lines 32 are sequentially delayed in a direction close to the gate driver 20. This makes the charging time of the pixel units 10 in different pixel areas 11 tend to be consistent. The specific delay algorithm is the same as that in the above-mentioned embodiment and is not repeated here.

It should be noted that, in the embodiment of the present application, only one microprocessor 52 is shown. In practical applications, multiple microprocessors 52 may be provided. Those skilled in the art can adjust as needed, which is not limited in this application.

The display panel provided by the present application is electrically connected with the microprocessor 52 through the feedback line 40, such that the turn-on time of the pixel unit 10 can be accurately calculated. Therefore, the delay time of the data signals provided by the source driver 30 to the plurality of data lines 32 along the direction of the pixel units close to the gate driver 20 for receiving the data signals can be accurately obtained. This makes the charging time of the plurality of pixel units 10 tend to be consistent, so as to solve the uneven charging of the pixel units 10 caused by the delay of the scan signal. This makes the display panel emit light unevenly and improves the display quality of the display panel.

Figure 8:
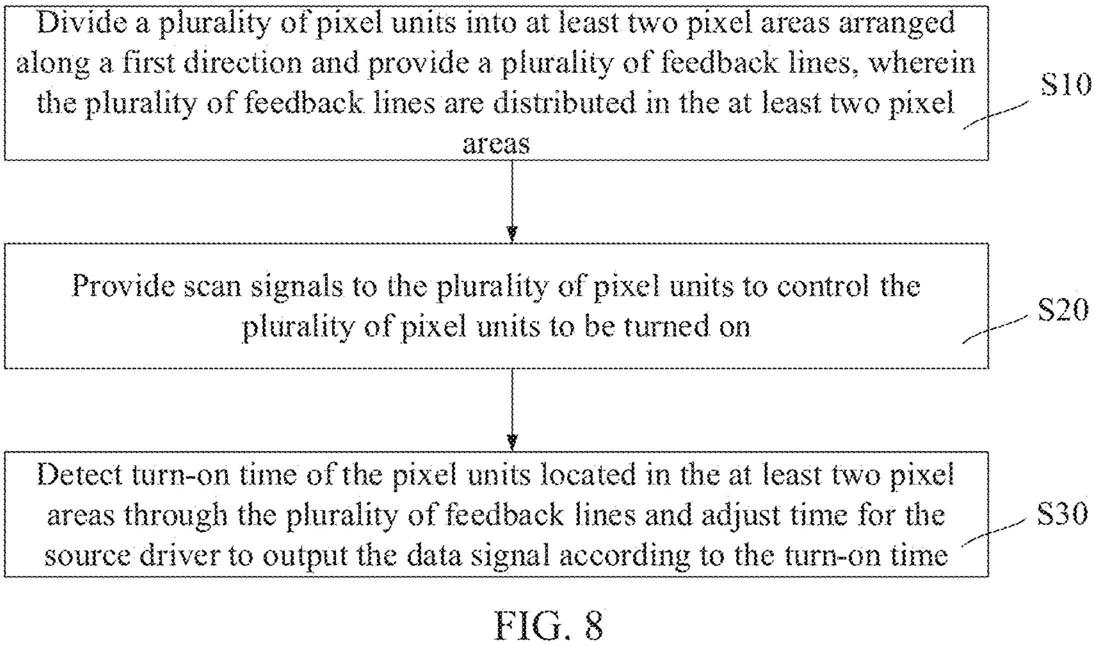
FIG. 8 is a schematic flowchart of a driving method provided by an embodiment of the present application.

Refer to FIG. 8, which is a schematic flowchart of a driving method provided by an embodiment of the present application. As shown in FIG. 8, the present application also provides a driving method for driving the above display panel, comprising the following steps.

S10: Divide a plurality of pixel units 10 into at least two pixel areas 11 arranged along a first direction X and provide a plurality of feedback lines 40, wherein the plurality of feedback lines 40 are distributed in the at least two pixel areas 11.

S20: Provide scan signals to the plurality of pixel units 10 to control the plurality of pixel units 10 to be turned on.

S30: Detect turn-on time of the pixel units 10 located in the at least two pixel areas 11 through the plurality of feedback lines 40, calculate a time difference between the turn-on time of the pixel units 10 located in at least two pixel areas 11, and adjust time for the source driver 30 to output the data signal according to the turn-on time.

Figure 9:
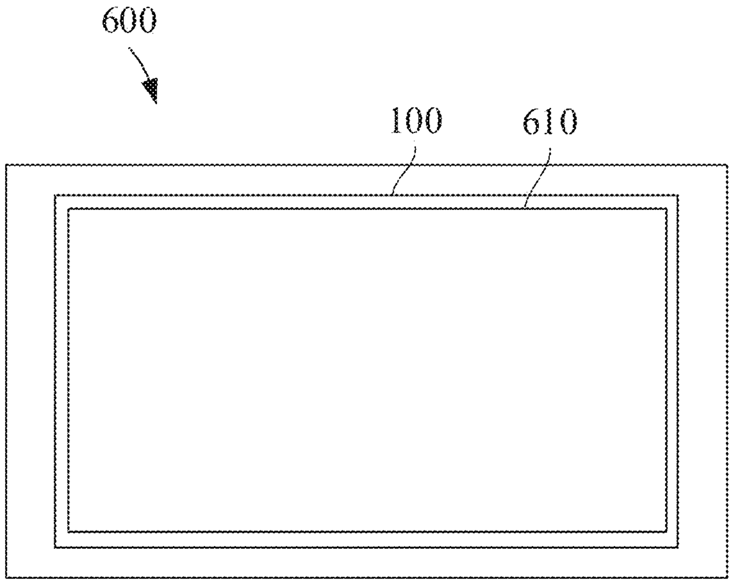
FIG. 9 is a schematic structural diagram of a display device provided by an embodiment of the present application.

Refer to FIG. 9, which is a schematic structural diagram of a display device provided by an embodiment of the present application. As shown in FIG. 9, the present application provides a display device 600, which includes a base substrate 610 and the above-mentioned display panel 100, and at least part of the display panel 100 is disposed on the base substrate 610.

The present application provides a display panel, a driving method, and a display device. The display panel includes a plurality of pixel units 10, a gate driver 20, a source driver 30, a plurality of feedback lines 40, and a control module 50. The display panel is provided with a feedback line 40 electrically connected to the gate driver 20 and the control module 50, such that the control module 50 can detect the turn-on time of the pixel units 10 located in the at least two pixel areas 11. The time difference between the turn-on time of the pixel units 10 located in at least two pixel areas 11 is calculated. The output time of the data signal is adjusted according to the time difference. This solves the issue of uneven display brightness caused by inconsistent pixel charging time in the prior art and improves the display performance.

The display device can be any product or component with display function, such as electronic paper, mobile phone, tablet computer, television, monitor, notebook computer, digital photo frame, and navigator.

A display panel, a driving method, and a display device provided by the embodiments of the present application are described above in detail. Specific examples are used herein to illustrate the principles and implementations of the present application. The descriptions of the above embodiments are only used to help understand the method and the core idea of the present application. In addition, for those skilled in the art, according to the idea of the present application, there may be changes in the specific embodiments and application scope. In conclusion, the content of this specification should not be construed as a limitation on this application.

What is claimed is:

1. A display panel, comprising:

a plurality of pixel units arranged in an array and divided into at least two pixel areas arranged along a first direction;

a plurality of scan lines arranged at intervals along a second direction, wherein one of the plurality of scan lines is connected to at least two pixel units in a same row;

a plurality of data lines arranged at intervals along the first direction and insulated and intersected with the plurality of scan lines, wherein one of the plurality of data lines is connected to at least one pixel unit in a same column;

a gate driver electrically connected with the plurality of scan lines;

a source driver electrically connected with the plurality of data lines;

a plurality of feedback lines, wherein one end of each of the plurality of feedback lines are electrically connected to at least one of the plurality of scan lines, and the one end of each of the plurality of feedback lines are distributed in the at least two pixel areas; and a control module electrically connected with the gate driver, the source driver, and another end of each of the plurality of the feedback lines, wherein the control module is configured to detect a turn-on time of the pixel units respectively located in the at least two pixel areas through the plurality of feedback lines and adjust a time when the source driver outputs data signals according to the turn-on time;

wherein the turn-on time of the pixel units is a time required for a voltage value of a scan signal of the pixel units to rise from 10% to 90% of a peak value of a scan signal voltage.

2. The display panel of claim 1, wherein the control module comprises a timing controller, the timing controller is electrically connected to the gate driver, the source driver, and the another ends of each of the plurality of the feedback lines, the timing controller is configured to detect the turn-on time of the pixel units respectively located in the at least two pixel areas through the plurality of feedback lines and adjust the time when the source driver outputs the data signals according to the turn-on time.

3. The display panel of claim 1, wherein the control module comprises a timing controller and a microprocessor, the timing controller is electrically connected to the gate driver, the source driver, and the microprocessor, the microprocessor is electrically connected to the another ends of each of the plurality of the feedback lines, the microprocessor is configured to detect the turn-on time of the pixel units respectively located in the at least two pixel areas through the plurality of feedback lines and feed the turn-on time back to the timing controller, and the timing controller is configured to adjust the time when the source driver outputs the data signals according to the turn-on time.

4. The display panel of claim 1, wherein a number of columns of the pixel units spaced between the plurality of feedback lines is same.

5. The display panel of claim 1, wherein the one ends of each of the plurality of the feedback lines are electrically connected to positions of a same scan line corresponding to the pixel units in a one-to-one correspondence.

6. The display panel of claim 1, wherein the control module is configured to adjust the time when the source driver outputs the data signals according to the turn-on time, such that the pixel units located in a same pixel area receive a same delay time of the data signals, and the delay time of the data signals applied in the pixel area closer to the gate driver is larger.

7. The display panel of claim 6, wherein an output time difference T of the data signals corresponding to the pixel units in the two pixel areas is:

$T=t_n-t_{n-1}$, wherein $t_n$ represents the turn-on time of the pixel units in an nth pixel area along a direction away from the gate driver, $t_m$ represents the turn-on time of the pixel units in an mth pixel area along the direction away from the gate driver, wherein both n and m are positive integers, and n is greater than m.

8. The display panel of claim 6, wherein each of the pixel areas comprises at least two columns of pixel units, and the one ends of each of the plurality of the feedback lines are connected to a position of the scan line corresponding to one column of pixel units, the one column of pixel units is a feedback pixel unit column; an output time difference T' of the data signals corresponding to the feedback pixel unit column in an adjacent pixel area is:

$T=t_n-t_{n-1}$, wherein $t_n$ represents the turn-on time of the pixel units in an nth pixel area along a direction away from the gate driver, and $t_{n-1}$ represents the turn-on time of the pixel units in an n-1th pixel area along the direction away from the gate driver; and wherein an output time of pixel unit columns other than the feedback pixel unit column in the pixel area is determined according to an output time interpolation of the data signals corresponding to nearest feedback pixel unit columns located on opposite sides of one of the pixel unit columns.

9. A driving method for driving a display panel, comprising:

dividing a plurality of pixel units into at least two pixel areas arranged along a first direction, providing a plurality of feedback lines, wherein the plurality of feedback lines are distributed in the at least two pixel areas;

providing a plurality of scan signals to the pixel units and the pixel units to be turned on;

detecting a turn-on time of the pixel units respectively located in the at least two pixel areas through the plurality of feedback lines and adjusting a time when a source driver outputs data signals according to the turn-on time;

wherein the turn-on time of the pixel units is a time required for a voltage value of a scan signal of the pixel units to rise from 10% to 90% of a peak value of a scan signal voltage.

10. A display device, comprising:

a display panel comprising:

a plurality of pixel units arranged in an array and divided into at least two pixel areas arranged along a first direction;

a plurality of scan lines arranged at intervals along a second direction, wherein one of the plurality of scan lines is connected to at least two pixel units in a same row;

a plurality of data lines arranged at intervals along the first direction and insulated and intersected with the plurality of scan lines, wherein one of the plurality of data lines is connected to at least one pixel unit in a same column;

a gate driver electrically connected with the plurality of scan lines;

a source driver electrically connected with the plurality of data lines;

a plurality of feedback lines, wherein one end of each of the plurality of the feedback lines are electrically connected to at least one of the plurality of scan lines, and the one end of each of the plurality of the feedback lines are distributed in the at least two pixel areas; and a control module electrically connected with the gate driver, the source driver, and another end of each of the plurality of the feedback lines, wherein the control module is configured to detect a turn-on time of the pixel units respectively located in the at least two pixel areas through the plurality of feedback lines and adjust a time when the source driver outputs data signals according to the turn-on time;

wherein the turn-on time of the pixel units is a time required for a voltage value of a scan signal of the pixel units to rise from 10% to 90% of a peak value of a scan signal voltage.

11. The display device of claim 10, wherein the control module comprises a timing controller, the timing controller is electrically connected to the gate driver, the source driver, and the another end of each of the plurality of the feedback lines, the timing controller is configured to detect the turn-on time of the pixel units respectively located in the at least two pixel areas through the plurality of feedback lines and adjust the time when the source driver outputs the data signals according to the turn-on time.

12. The display device of claim 10, wherein the control module comprises a timing controller and a microprocessor, the timing controller is electrically connected to the gate driver, the source driver, and the microprocessor, the microprocessor is electrically connected to the another end of each of the plurality of the feedback lines, the microprocessor is configured to detect the turn-on time of the pixel units respectively located in the at least two pixel areas through the plurality of feedback lines and feed the turn-on time back to the timing controller, and the timing controller is configured to adjust the time when the source driver outputs the data signals according to the turn-on time.

13. The display device of claim 10, wherein a number of columns of the pixel units spaced between the plurality of feedback lines is same.

14. The display device of claim 10, wherein the one ends of each of the plurality of the feedback lines are electrically connected to positions of a same scan line corresponding to the pixel units in a one-to-one correspondence.

15. The display device of claim 10, wherein the control module is configured to adjust the time when the source driver outputs the data signals according to the turn-on time, such that the pixel units located in a same pixel area receive a same delay time of the data signals, and the delay time of the data signals applied in the pixel area closer to the gate driver is larger.

16. The display device of claim 15, wherein an output time difference T of the data signals corresponding to the pixel units in the two pixel areas is:

$T=t_n-t_{n-1}$, wherein $t_n$ represents the turn-on time of the pixel units in an nth pixel area along a direction away from the gate driver, $t_m$ represents the turn-on time of the pixel units in an mth pixel area along the direction away from the gate driver, wherein both n and m are positive integers, and n is greater than m.

17. The display device of claim 15, wherein each of the pixel areas comprises at least two columns of pixel units, and the one ends of each of the plurality of the feedback lines are connected to a position of the scan line corresponding to one column of pixel units, the one column of pixel units is a feedback pixel unit column; an output time difference T' of the data signals corresponding to the feedback pixel unit column in an adjacent pixel area is:

$T=t_n-t_{n-1}$, wherein $t_n$ represents the turn-on time of the pixel units in an nth pixel area along a direction away from the gate driver, and $t_{n-1}$ represents the turn-on time of the pixel units in an n-1th pixel area along the direction away from the gate driver; and wherein an output time of pixel unit columns other than the feedback pixel unit column in the pixel area is determined according to an output time interpolation of the data signals corresponding to nearest feedback pixel unit columns located on opposite sides of one of the pixel unit columns.

* * * * *